(12) United States Patent
Ivanov et al.

(10) Patent No.: US 7,779,478 B2
(45) Date of Patent: *Aug. 17, 2010

(54) SYSTEM AND METHOD FOR DISTRIBUTED MODULE AUTHENTICATION

(75) Inventors: Lazar Ivanov Ivanov, Seattle, WA (US); Caglar Gunyakti, Sammamish, WA (US); Kristjan E. Hatlelid, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/021,160

(22) Filed: Jan. 28, 2008

(65) Prior Publication Data

US 2008/0235791 A1    Sep. 25, 2008

Related U.S. Application Data

(63) Continuation of application No. 10/794,949, filed on Mar. 5, 2004, now Pat. No. 7,325,126.

(51) Int. Cl.
*G06F 21/24* (2006.01)
(52) U.S. Cl. .......................... 726/26; 726/22; 713/187
(58) Field of Classification Search ............... 713/182, 713/187, 189, 193
See application file for complete search history.

(56) References Cited

U.S. PATENT DOCUMENTS

| | | | |
|---|---|---|---|
| 5,859,911 A * | 1/1999 | Angelo et al. ............... 713/187 |
| 6,012,087 A | 1/2000 | Freivald et al. ............. 709/218 |
| 6,185,678 B1 * | 2/2001 | Arbaugh et al. ................ 713/2 |
| 6,581,159 B1 * | 6/2003 | Nevis et al. ..................... 713/2 |
| 6,748,538 B1 * | 6/2004 | Chan et al. ..................... 726/26 |
| 6,892,323 B2 * | 5/2005 | Lin .............................. 714/36 |

OTHER PUBLICATIONS

Ivanov, API Hooking Revealed, Dec. 2002.*
Arenas, M. et al., "Answer Sets for Consistent Query Answering in Inconsistent Databases," *Theory and Practice of Logic Programming*, 2003, 3(4-5), 393-424.
Gelard, P. et al., "Atlas—An ATM Demonstration Experiment for High-Rate Space Telemetry Transportation," *Computer Networks and ISDN Systems*, 1994, 25(S3), S99-S103.

* cited by examiner

*Primary Examiner*—Minh Dinh
(74) *Attorney, Agent, or Firm*—Woodcock Washburn LLP

(57) ABSTRACT

Distributed module authentication allows security checks to be initiated by multiple software modules. Module authentication processes can be inserted into two or more modules in an operating system and/or various other applications. These module authentication processes can verify the integrity of binaries associated with one or more modules in computer memory. Security checks can be performed on modules stored on disk, in active system memory, or in any other location. Various security checks can be coordinated with each other to ensure variety and frequency of module authentication, as well as to randomize the module authentication process that performs a particular security check. In addition, security processor code can be interleaved within normal application code, so the security code is difficult for attackers to remove or disable without damaging the useful functionality of an application.

23 Claims, 10 Drawing Sheets

```
Perform static authentication.
SAMPLE RESULT: Disk image OK.
```
⇓
```
Mimic loader process.
RESULT: An image of the loaded
module in the partitioned area as it
should appear in the standard
operating space.
```
⇓
```
Compare module image in partitioned
area to module image in standard
operating space
SAMPLE RESULT: NEGATIVE
```
⇓
```
If result is POSITIVE, proceed
normally. If result is NEGATIVE,
disable module 777.
```

Dynamic Authentication

FIG. 4C

(Prior Art)

SYSTEM AND METHOD FOR DISTRIBUTED MODULE AUTHENTICATION

CROSS-REFERENCE TO RELATED APPLICATION

This application is a continuation of U.S. application Ser. No. 10/794,949, filed Mar. 5, 2004, which is hereby incorporated by reference in its entirety.

FIELD OF THE INVENTION

This invention relates to computer software, and more particularly to digital rights management.

BACKGROUND OF THE INVENTION

Software piracy is a problem of enormous proportions for commercial software developers. According to an ongoing study undertaken by the Business Software Alliance (BSA) to measure the extent and effects of software piracy, the world piracy rate in 2002 was 39%. This figure reflects the estimated percentage of copies of business software installed without a license. In North America the piracy rate was 24%, the lowest in the world. In Vietnam, the piracy rate was a staggering 95%, and in China it was 92%. The global losses to software developers due to piracy was estimated at $13.08 billion. $2.3 billion of this amount is attributable to piracy in North America.

Many solutions have been implemented in response to the piracy problem. Often, security features are designed into software modules to discourage, thwart, or increase the difficulty of pirating. A software module, or module, is a collection of routines and data structures that performs a particular task or implements a particular tool for use by a computer. As used here, a module can be anything from a single-task software unit to a many-task software unit. For example, a module could range from part of a software application to an entire application, or part of an operating system or an entire operating system. One frequently employed security feature instructs a module to disable its host software application if the application is not registered with its developer within a reasonable amount of time. Such security features that are designed into software modules, as well as any other security feature designed to prevent software piracy, are referred to as "security processor code." Security processor code can be altered or disabled, however, by reverse engineering and either removing the security processor code from a module or disabling it. Therefore, in the effort to reduce piracy, it is desirable to detect and prevent the alteration of software modules.

Such detection of module alteration is made more difficult by the fact that software modules may be changed by legitimate use. However, there are usually parts of software modules that will not change with legitimate use, and detection can focus on such parts to determine if a software module has been tampered with. A software module that has been tampered with by changing binaries that should not change with the legitimate use of the software module is said to be of compromised integrity. Performing a security check to determine if a software module is of compromised integrity may be referred to as checking the integrity of a software module, or checking if a module is compromised.

One method of preventing such module tampering involves digitally signing a module and including periodically checking the signature. The procedure for signing modules warrants brief discussion. FIG. 1A and FIG. 1B illustrate the salient concepts corresponding to this description. With reference to exemplary Module 25 in FIG. 1A, software modules, when compiled, comprise strings of bits, the familiar electronic zeros and ones. Each string of bits represents a binary number. Note that for simplicity of illustration Module 25 does not show separation between the strings representing discrete binary numbers. The term "binaries" refers to two or more binary numbers, which may be either the entire set or some subset of the binary numbers that are stored in computer memory. The binaries associated with a software module represent the coded commands written and compiled by a module developer. Changes to the binaries of modules, such as the exemplary change to Module 25, are sometimes referred to as "binary patching," because attackers frequently do not have the source code for modules and therefore make changes directly to the stored binaries. Binary patching is the replacement of some of the binaries in a module with new binaries intended to change some function of the original module.

Signing a module, such as Module 25, often involves hashing all or a selected subset of the module binaries. Hashing refers to generating a unique number that is based on the selected binaries, usually using special cryptographic techniques to generate a unique signature or fingerprint of an input binary stream. A property of hashing is that it is "collision resistant"—it is very difficult to find another binary stream which will generate the same hash value and corresponding signature after the hash function is applied to it. The hashing function which is applied to the input binary stream is usually also called a "one way," or "trap door" function and the signature is also called a "cryptographic checksum."

In a simplified version of hashing, the "ones" of selected binaries in a module may be added together to generate a unique number. The resulting unique number is associated with a developer's original version of a module. The hash result is sometimes called a "checksum." Importantly, a checksum can be stored and kept with the module. A software developer can hash a module and sign the resulting checksum, for instance, using a his or her private key in a public/private key system. FIG. 1A points out an exemplary checksum that has been encrypted using a developer's private key and included in Module 25. This exemplary checksum was created prior to the binary patch inserted into Module 25 by an attacker, and therefore contains a number that would not be computed if the hash was performed on patched Module 25 as shown in FIG. 1A.

Public/private key pairs are generated through asymmetric encryption. Checksums encrypted with a private key can only be decrypted using a public key, and vice versa. If a software developer signs a checksum using a private key, he or she can be sure that only those in possession of the public key will be able to read the checksum. Users who decrypt the signed checksum with the public key can be sure it was signed by the developer, because only the developer had the private key. Many computer users today are familiar with the situation in which they are asked to enter a key number when installing modules on computing devices. The public key number is typically provided on the packaging of the module.

The user, or, more appropriately, an operating system ("OS") running on a user's computer, can check the developer's signed checksum to verify that a module is a developer's original version. This process is illustrated in the flowchart of FIG. 1B. First, the user's OS can compute its own checksum for a software module by executing the same hash technique as the developer. An exemplary result of such a computation is provided in FIG. 1B. The user's OS can then decrypt the developer's signed checksum using a public key. Such decryption could yield the exemplary result provided in FIG. 1B. Finally, the user's OS could compare the computed checksum against the developer's signed checksum. If the user's OS computed a checksum that matches the developer's signed checksum, the module most likely has the same binaries that it had when the developer signed it. In other words, the module has not been tampered with, because any change to the module instructions, such as disabling security features, would also have changed the associated binaries. If a module has been tampered with, as shown in FIG. 1A, the checksums will not match. The module may be designed to disable itself or take other protective measures if tampering is discovered.

Operating systems, such as the familiar MICROSOFT® WINDOWS family of operating systems, may execute the process described above with regard to modules in the OS itself, or on behalf of application modules running on the OS. An OS that provides such security features allows software developers to focus more on the functional features of the modules they develop, and less on the task of independently generating security processor code for preventing piracy. In this regard, an OS can periodically calculate checksums for applications and other modules, and validate those checksums against the developer's signed checksums. If the checksums match, the OS can proceed with normal operation, but if they do not match, the OS may be designed to take protective measures.

The process of ensuring the integrity of module binaries, in general, is referred to in the industry as module authentication. It may also be referred to here as a security check. One drawback of present module authentication techniques is that, like other security features designed into applications, it can be reverse engineered and disabled. Consider, for example, FIG. 1A, and imagine that Module 25 is an OS performing module authentication on one of its modules. If the module authentication feature for Module 25 was represented by the very binaries that were patched, then no module authentication would occur. This would leave attackers free to continue to hunt down and disable other security processor code protecting Module 25, because further changes to the binaries would go undetected.

In the case of an OS that performs module authentication on behalf of application modules, disabling module authentication in the operating system could successfully circumvent piracy protection for all applications that relied on the OS for periodic module authentication. This situation is illustrated in FIG. 2. "ModuleAuthenticator.exe" is security processor code in an OS that is designed to perform module authentication for the various modules running on the OS, which may include OS modules. Each arrow to a module represents a module authentication as described with reference to FIG. 1B. Note that the strategic placement of a binary patch in an OS such as that of FIG. 2 can block all module authentications performed by ModuleAuthenticator.exe. As sophisticated as techniques may be for guarding against attacks on such an OS module authentication design, the fact remains that when such a centralized system is compromised, any module that relied on the OS for security support is also compromised.

Likewise, centralized module authentication systems are more susceptible to relatively easy reverse engineering. This is because, once found, the binaries that represent a module authentication function can be patched without further search or concern that the patch will be detected. The task of finding the module authentication binaries may be arduous, but need be conducted only once. Moreover, the search for binaries representing the module authentication function is limited to binaries of the operating system, which reduces the field of search required of would-be attackers.

In light of the above deficiencies in module authentication techniques, there is an a need in the industry to raise the bar in software protection techniques used to prevent binary patching and maintaining the integrity of the security processor code.

SUMMARY OF THE INVENTION

A system and method for distributed module authentication allows security checks to be initiated by multiple software modules. Security checks are performed by module authentication processes. Module authentication processes can be inserted into two or more modules in an operating system and/or inserted into various applications or other software modules running on an operating system. These module authentication processes can verify the integrity of binaries associated with one or more modules in computer memory. Security checks can be performed on modules stored on disk, in active system memory, or in any other location. Various security checks can be coordinated with each other to ensure variety and frequency of module authentication, as well as to randomize the module authentication process that performs a particular security check. Security checks can be initiated at random times, so that module authentication can originate from any of several sources at an unknown time. New modules installed on the system can be inoculated to take part in the distributed module authentication system. In addition, security processor code can be interleaved within normal application code, so the security code is difficult for attackers to remove or disable without damaging the useful functionality of an application.

BRIEF DESCRIPTION OF THE DRAWINGS

FIG. 4C is a flow chart with exemplary steps to be carried out in a dynamic module authentication process.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 3:
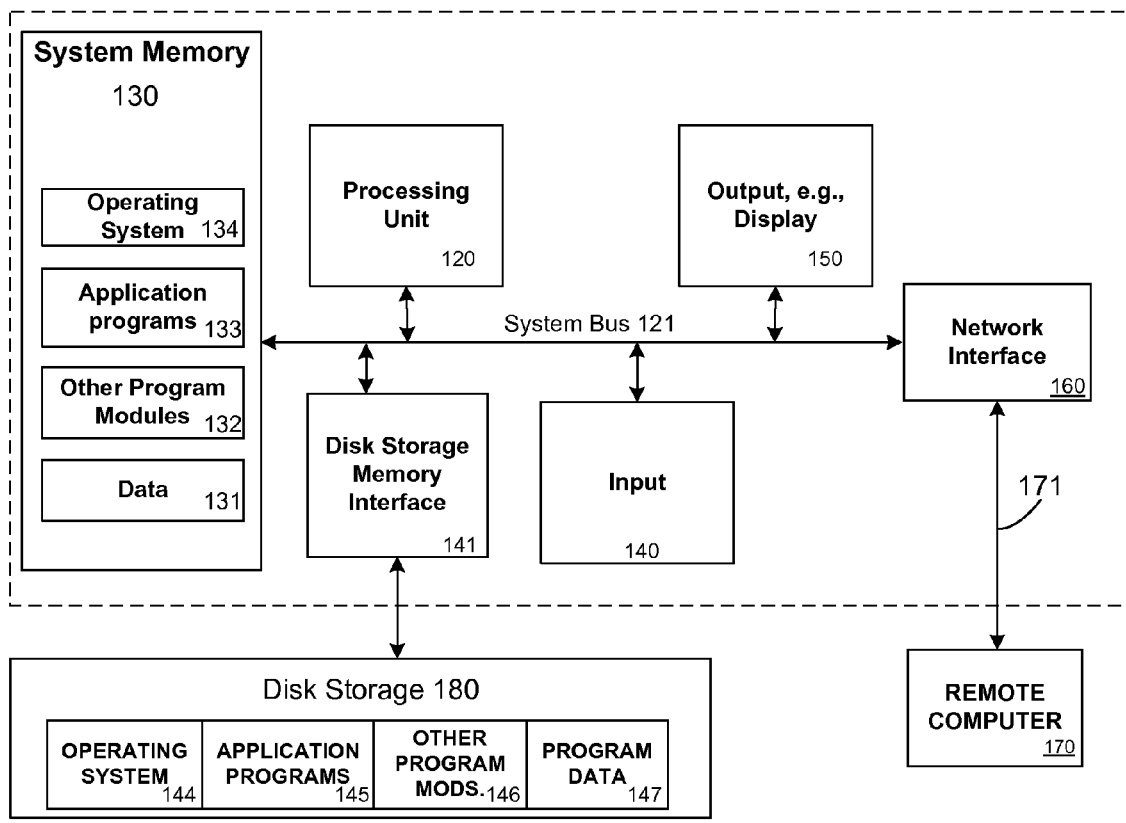
FIG. 3 is an exemplary computer with system memory and disk storage 180, as well as other common features of a typical computer.

In the figures corresponding to the following detailed description, identically identified elements relate to identical features. For example, the Operating System 134 in FIG. 3 is the same Operating System 134 in FIG. 4B. This is done for easy reference back and forth between the figures, and to help provide a greater context for the components in the figures. For example, it may be useful for the reader to see that the system memory 130 of FIG. 4B exists in the greater context of a computer 107 as provided in FIG. 3.

Various aspects of the invention are designed for implementation in conjunction with computing devices. FIG. 3 and the following discussion are intended to provide a brief general description of a suitable computing environment. It should be understood that handheld, portable and other computing devices and computing objects of all kinds are contemplated for use in connection with the present invention, i.e., anywhere where that module authentication is supported in a computing environment. While a general purpose computer 107 is described below, this is but one example, and embodiments of the invention may be implemented with a thin client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of distributed module authentication techniques in accordance with the invention.

The invention can be implemented via an operating system, for use by a developer of services for a device or object, and/or included within application software that operates in connection with the distributed module authentication techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

With reference to FIG. 3, an exemplary system for implementing the invention includes a general purpose computing device in the form of a computer 107. Components of a computer 107 may include, but are not limited to, a processing unit 120, a system memory 130, and a system bus 121 that couples various system components, including the system memory, to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

A user may enter commands and information into the computer 107 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120 through a user input interface 140 that is coupled to the system bus 121, but may be connected by other interface and bus structures, such as a parallel port, game port or a universal serial bus (USB). A monitor or other type of output device may also be connected to the system bus 121 via an interface, such as a video interface, which may in turn communicate with a video memory. In addition to a monitor, computers may include other peripheral output devices such as speakers and printers, which may be connected through an output peripheral interface 150.

Computer 107 typically includes a variety of computer readable media. For the purposes of module authentication, computer readable media can be categorized into two groups: disk storage 180 and system memory 130. Both of these types of memory will be referred to collectively as memory or computer memory. The quintessential example of disk storage 180 is the hard drive. A hard drive is the primary long-term computer storage device, which typically spins, reads from and writes to one or more fixed disk platters. The hard drive is typically connected to the system bus 121 through a computer readable media memory interface 141. Disk storage 180 may also include other computer readable media, such as a magnetic disk drive that reads from or writes to a removable, nonvolatile magnetic disk, and an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like.

System memory 130 includes computer storage media in the form of volatile and/or nonvolatile memory such as read only memory (ROM) and random access memory (RAM). The quintessential example is RAM. RAM is usually a group of memory chips, typically of the dynamic RAM (DRAM) type, which function as a computer's primary workspace. RAM typically contains data and/or program modules that are immediately accessible to and/or presently being operated on by processing unit 120. System memory 130 may also include portions of an operating system 134, application programs 133, other program modules 132, and program data 131.

Module authentication can be conducted statically, meaning that the binaries that are authenticated reside in disk storage 180, as defined above. It can also be conducted dynamically, meaning authenticated of binaries in system memory, as defined above. Sometimes both on-disk module authentication and dynamic module authentication are performed for enhanced security. This invention may be used in conjunction with either type of module authentication, or with a combination of both. FIG. 1A, FIG. 1B, FIG. 2, FIG. 4A, FIG. 4B, and FIG. 4C, along with the following description, illustrate the two types of module authentication.

Figure 1A:
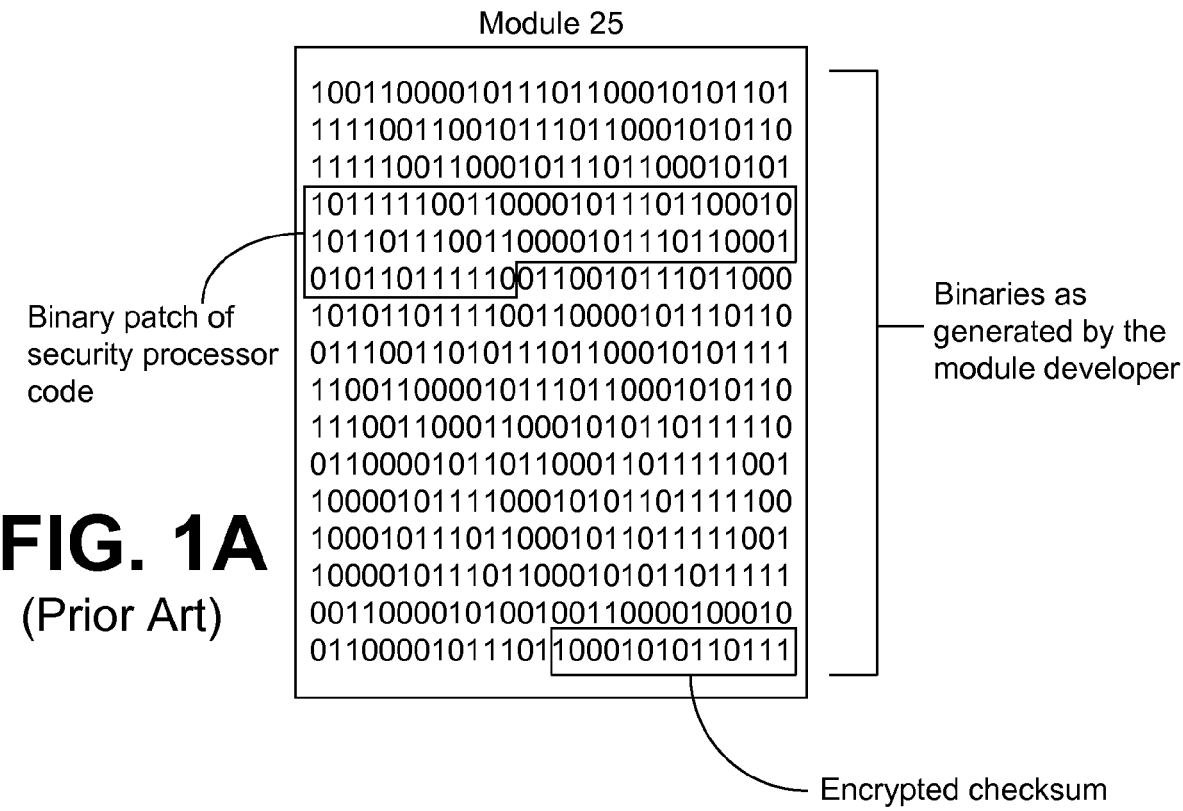
FIG. 1A is a simplified illustration of binaries that make up a software module. The binaries were signed by the software developer, and subsequently patched by an attacker.
Figure 1B:
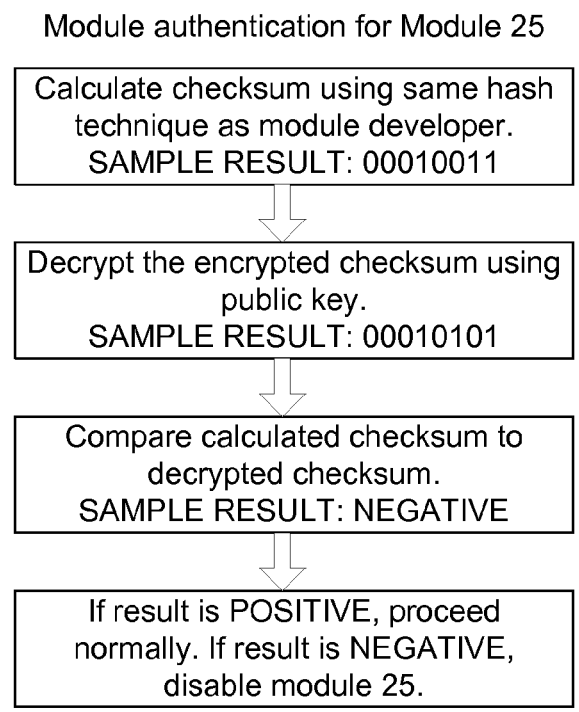
FIG. 1B is a flowchart outlining the steps undertaken by a module authenticator process when performing static module authentication.
Figure 2:
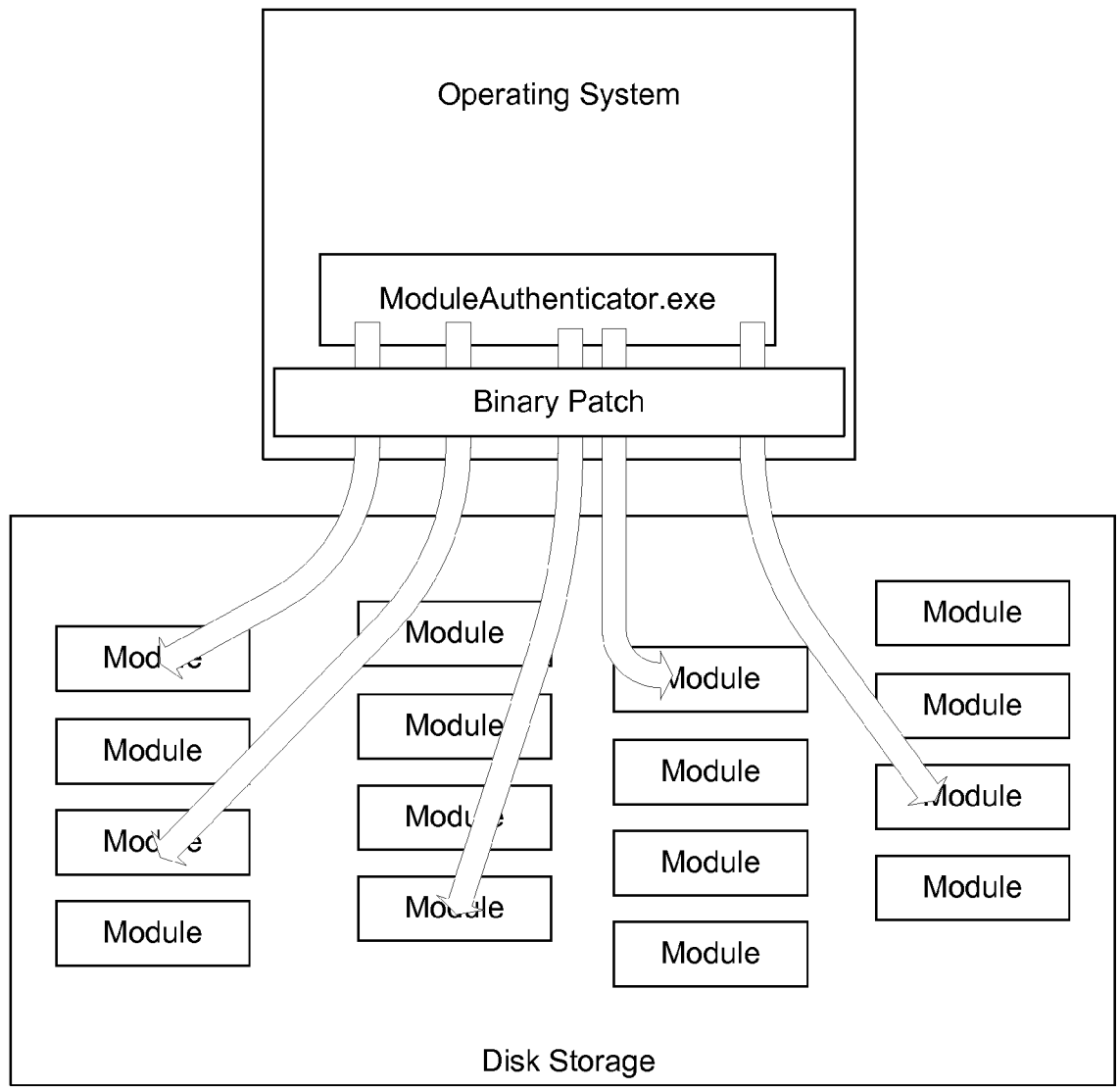
FIG. 2 illustrates an operating system with a module authenticator process designed to authenticate the various modules of a computer system. The operating system was patched to disable the module authenticator process, leaving all of the modules vulnerable to tampering.

Static module authentication proceeds according to the description of module authentication in the background section of this document. FIG. 1A, FIG. 1B, and FIG. 2 provide an illustration of static authentication. In short, an OS may contain a module authenticator process such as the "ModuleAuthenticator" of FIG. 2, that is designed to periodically ensure that the binaries of modules, as those modules are stored on disk, have not been altered from the binaries shipped by a software developer. The module authenticator may be any format or configuration of binaries in computer memory for carrying out the module authentication process. In this regard, it can be an executable file, as depicted in FIG. 2, or a file of any other type. Importantly, the module authenticator process may be inserted into an Import Address Table ("IAT"), as will be explained in greater detail below. The depiction of the ModuleAuthenticator.exe process in FIG. 2 is not intended to limit the invention, but rather to suggest the functional aspects of the element. The ModuleAuthenticator.exe of FIG. 2 may perform the steps of FIG. 1B on any of the modules stored in disk storage 180. In this regard, the exemplary disk storage 180 categories from FIG. 3 (operating system 144, application programs 145, other program modules 146, or other program data 147) may be been imported into FIG. 2 as the various stacks of modules represented in FIG. 2.

Static module authentication is a straightforward process, because the disk storage 180 image of a software module is predictable. The term "image" refers to the complete set, or a selected subset of binaries associated with a software module. Because the image of a software module in disk storage 180 will generally remain the same as the original disk-storage image delivered by a developer, validating that image is straightforward. While some of the binaries may be moved or changed with legitimate use of an application, such movement is foreseeable and the binaries that may be moved can be excluded from the checksum calculation both by the software developer and by the user's OS. For example, a user OS can parse the headers of an executable file to discover the location of binaries that can legitimately change in disk storage 180. Examples of such changeable data are timestamps and the certificate sections. The binaries representing such portions of a module in disk storage 180 can be skipped when performing a hash of the file.

The purpose of static module authentication is generally to establish the authenticity of the on-disk images of important executable modules in an application process space. An OS may determine which executable modules are running frequently, and engage in a static authentication of those modules by directing the ModuleAuthenticator.exe to perform authentication of the appropriate modules. This is depicted in FIG. 2 by the arrows from ModuleAuthenticator.exe to the various modules in disk storage 180. Each arrow represents an authentication of the indicated module. As illustrated in FIG. 2, authentication can be conducted of any module in disk storage 180, including both application modules and OS modules. If desired, other data, such as program data could also be authenticated although it may be beneficial to allow such data to be legitimately altered.

Note that static authentication does little to protect the execution environment directly, because it authenticates binaries on disk, not binaries in system memory. It does, however, serve an important purpose: It gives some assurance of the identity of a running application beyond simply a matching module name, and it provides a basis for determining if an in-memory image of an application is authentic—a basis for dynamic module authentication.

Dynamic module authentication is the authentication of in-memory images of modules loaded into system memory. While static module authentication gives an assurance that a software module as stored on disk has not been tampered, dynamic module authentication provides for assurance that binaries as loaded into system memory 130 have not been tampered with. Dynamic authentication is the mechanism by which a piracy protection system can protect an application's execution environment against attacks such as code redirection via import tables or inserted jump instructions and even software breakpoints ("int 3's"). Since code pages can be tampered anytime during the life a process, dynamic module authentication may be an ongoing task. Dynamic module authentication can be expensive in terms of the processor and memory resources it consumes, and so is typically managed carefully.

Figure 4A:
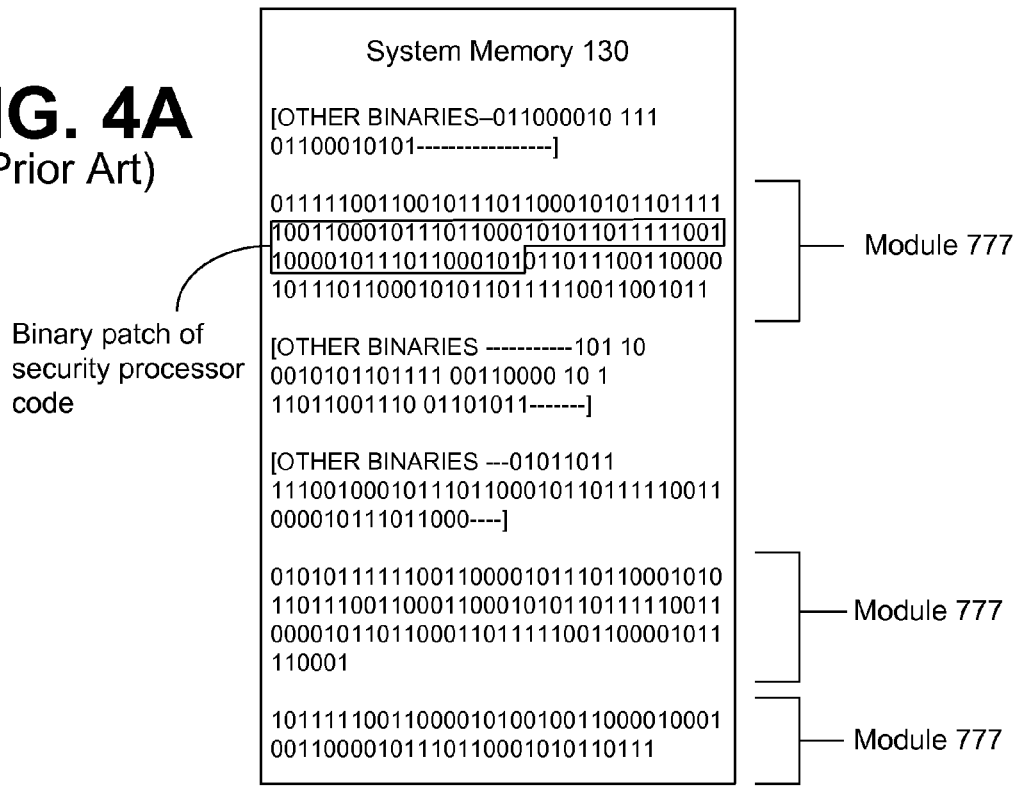
FIG. 4A illustrates static module authentication. A module authenticator process performs random checks on the modules of a computer system.
Figure 4B:
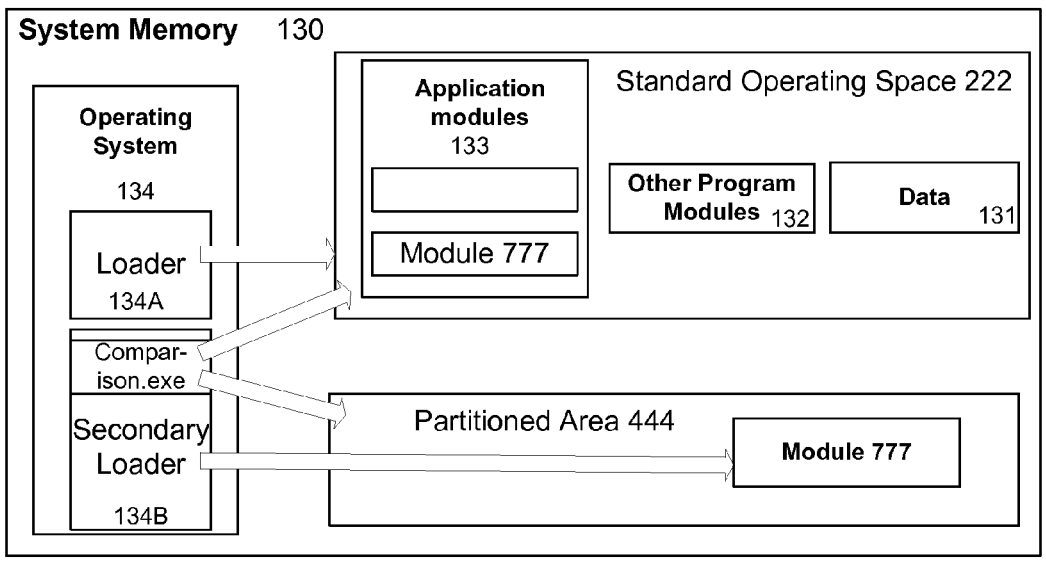
FIG. 4B illustrates dynamic module authentication. A loader loads various modules into system memory, a secondary loader mimics the loader process, and a third process compares the binaries in system memory.

Dynamic authentication is illustrated in FIG. 4A, FIG. 4B, and FIG. 4C. Since static authentication may be performed as a part of dynamic authentication, refer to FIG. 1A, FIG. 1B, FIG. 2, and corresponding description for a review of the static authentication process. Because the location in system memory of the binaries associated with a particular software module are not predictable, dynamic module authentication can first authenticate the on-disk image of a module, then determine where the binaries will be stored in system memory, and finally validate that the binaries in system memory are as they should be.

FIG. 4A provides a view of the binaries associated with an exemplary Module 777 as they may be stored in system memory 130. System memory 130 resources are relocated as necessary by a processing unit 120, and as such the binaries associated with exemplary Module 777 are scattered across various locations in system memory 130. The existence of other binaries, as shown in FIG. 4A, interlined with the binaries of Module 777 does not necessarily indicate that Module 777 has been tampered with. Instead, it may simply indicate that the processing unit 120 is conducting ordinary business and moving system memory 130 resources as convenient to provide any requisite processing. Notice, however, that the binaries of Module 777, once again, have been patched, as indicated in FIG. 4A. The task performed by dynamic module authentication is the determination of whether a module such as exemplary Module 777 has been patched, or simply moved and interlined with other binaries in a legitimate fashion by the processing unit 120.

FIG. 4B demonstrates a solution to the problem of unpredictability in the system memory 130 location of binaries associated with a software module. The process of loading software modules into system memory 130 from disk storage 180 is known as loading, and is performed by a loader 134A. FIG. 4B demonstrates modules (e.g., Application Modules 133 including Module 777) that have been loaded into system memory 130 by an operating system loader 134A in connection with the normal operation of a computer system. In order to authenticate the modules that have been loaded into the standard operating space 222, a secondary loader 134B that may be a part of security processor code can mimic the loading task of the original loader 134A, by loading the same module, e.g., module 777, into a partitioned area 444 of system memory 130. In doing so, the secondary loader 134B can determine where the binaries of a loaded software module should be in the standard operating space 222. This is because a module should load the same way each time, placing the same binaries in the same locations in the standard operating space 222. After the secondary loader 134B has mimicked the task of the original loader 134A, the security processor code can engage in comparing the binaries loaded into the standard operating space 222 of system memory 130 and the binaries loaded into the partitioned area 444 of system memory 130. This process is depicted in FIG. 4B by the presence of the "comparison.exe" element with arrows to both the partitioned area 444 and the standard operating space 222. If the binaries match, exemplary module 777 has not been tampered with, but if the binaries do not match, they have been altered and protective measures may then be engaged by the operating system 134.

FIG. 4C provides a flowchart to illustrate this process. With reference to FIG. 4C, dynamic authentication may first involve a static module authentication. The purpose for this is to ensure that the loaded software module is in fact the signed original shipped by a software developer or other creator of the software module. FIG. 4B provides a sample result for such static authentication, showing that the outcome indicated a valid disk image of the software module. If the disk image were to be invalid, the authentication process could be discontinued and protective measures taken. Otherwise, the next step that may be performed is to mimic the loader's task by loading the module into a partitioned area of system memory. This will distribute the binaries across the partitioned area in the same fashion as the distribution created by the loader 134A in the standard operating space 222. If static authentication was performed immediately prior to loading a module into the partitioned area 444, a valid system memory 130 image of the module is ensured. This image may then be compared with the module binaries in the standard operating space 222, as indicated in the next box of FIG. 4C. This may involve a straightforward bit-by-bit comparison of the portions of the partitioned area 444 containing module binaries to corresponding portions of the standard operating space 222. It may also involve computing hashes of standard operating space 222 module pages for comparison with expected hash values that can be computed and stored during dynamic module authentication setup. If the binaries match, the module running in the standard operating space 444 is valid. If they do not match, however, the binaries have been altered from what they should be and protective measures may be taken.

One common type of attack is to redirect code by modifying a module's import address table (IAT). Dynamic module authentication can be used to prevent this obvious attack. For example both static IATs and delay load IATs can be protected by independently constructing ("binding") the IATs and comparing this to the actual IAT in use. Likewise, any type of module or other software fragment can be authenticated using the above static and dynamic module authentication techniques.

The above descriptions of static and dynamic authentication are for the purpose of introducing terms and concepts in the art of module authentication. It should be understood that the invention is not limited to any particular type of module authentication. Static authentication, dynamic authentication, and all other forms of module authentication presently in use or later developed are considered likely candidates for use in conjunction with the present invention. The term module authentication refers to all possible techniques of module authentication, and should be limited to a particular kind of module authentication only if that kind of authentication is directly specified.

Figure 5:
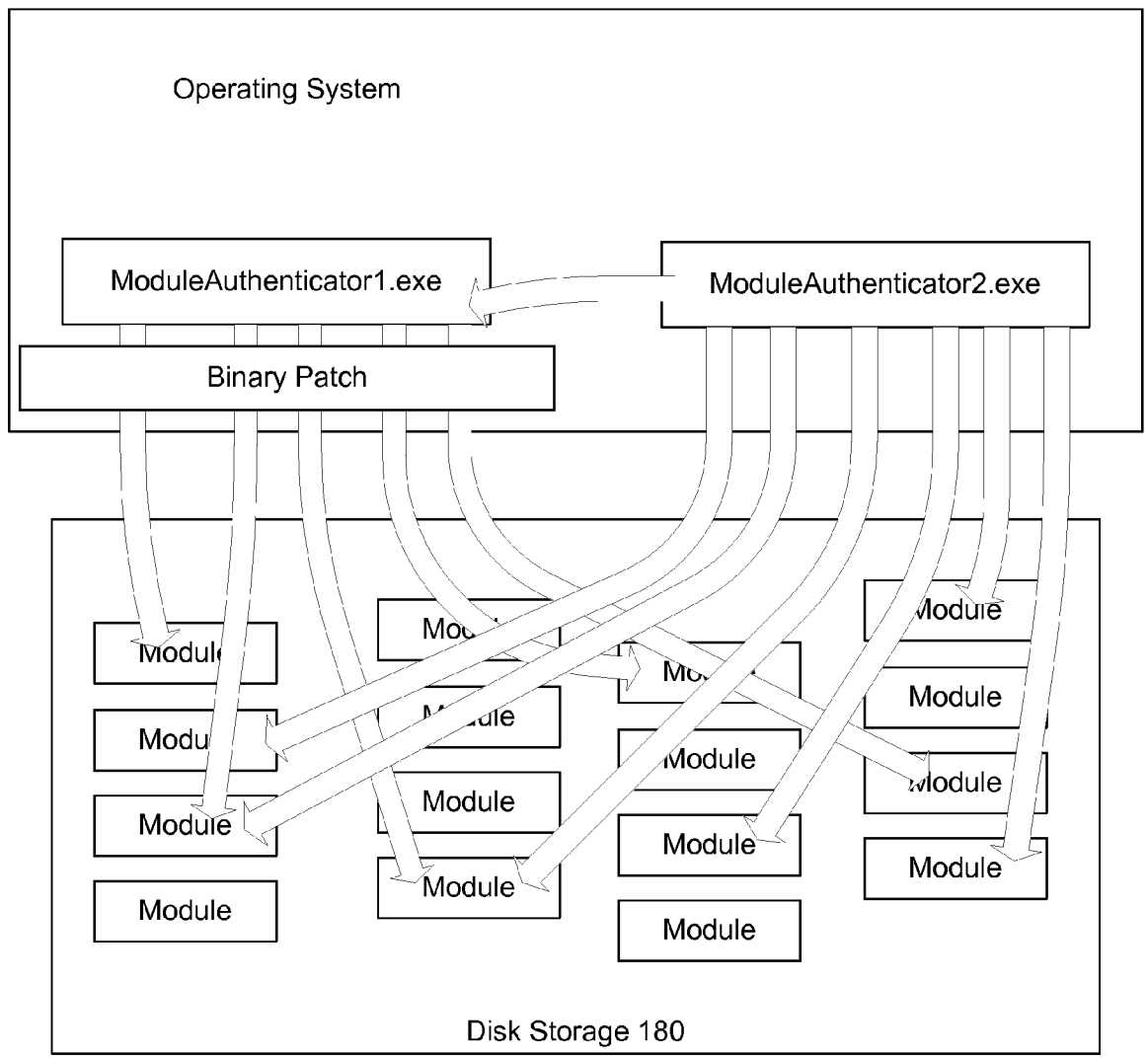
FIG. 5 is a simplified view of multiple module authentication processes, showing only two module authentication processes, both bundled with an operating system, performing static module authentication and an authentication of other module authentication processes.

Refer now to FIG. 5, which provides a simplified view of various embodiments of the invention. FIG. 5 presents a view similar to that of FIG. 2, except in place of a single module authentication process, ModuleAuthenticator.exe in FIG. 2, there are multiple module authentication processes, ModuleAuthenticator1.exe and ModuleAuthenticator2.exe. This illustration is simplified for the purpose of clear illustration and it will be appreciated that an operation system such as that in FIG. 5 could contain any number of module authentication processes. Each module authentication process in FIG. 5 is performing module authentication on various modules stored in disk storage 180. These modules are presented, as in FIG. 2, as generic boxes marked "Module." The intended definition of the term module as used here, once again, is any software fragment, from a discrete unit of functional utility such as the modules used in modular programming, all the way up to an entire application or operating system. A module could also be non-functional data stored in computer memory. Module is defined in this way to emphasize that embodiments of the invention may perform module authentication on any type of stored computer information, whether functional, nonfunctional, multifunctional, large, small, etc.

As in FIG. 2, the arrows in FIG. 5 represent module authentication processes performed on the indicated modules. It should be emphasized that either or both of the module authentication processes of FIG. 5, i.e., ModuleAuthenticator1.exe and ModuleAuthenticator2.exe may perform module authentication on any of the modules in disk storage 180. These module authentication processes may also perform multiple module authentication processes on the same module. This aspect of the module authentication processes is referred to as performing repeated module authentication processes or repeatedly performing module authentication processes. Repeatedly performing module authentication processes does not limit a module authentication process to authentication a single module. Instead, repeated module authentication refers to a single module authentication process, as represented by a discrete set of security processor code, performing multiple module authentications which may be conducted on a variety of modules both in disk storage 180 on in system memory.

FIG. 5 shows a binary patch that has been inserted into the operating system to disable ModuleAuthenticator1.exe. In this regard, FIG. 5 is similar to FIG. 2, and demonstrates that embodiments of the present invention do not theoretically render impossible the task of reverse engineering security processor code and disabling it. In this regard, the binary patch represents tampering with ModuleAuthenticator1.exe. Importantly, the successful disabling of ModuleAuthenticator1.exe did not also disable ModuleAuthenticator2.exe. In this regard, aspects of the present invention make it more difficult to disable the module authentication processes of one or more computer systems, because there are more module authentication processes to discover and disable for would-be attackers. Therefore, some of the modules that were authenticated by ModuleAuthenticator1.exe are also authenticated by ModuleAuthenticator2.exe. Attempts to tamper with these modules after disabling ModuleAuthenticator1.exe will not go undetected. Note also the ModuleAuthenticator2.exe can perform an authentication of ModuleAuthenticator1.exe, along with any other module, as explained above. In this embodiment the disabling of ModuleAuthenticator1.exe will be discovered, and appropriate protective measures can be taken.

The distribution and timing of security checks performed by any single module authentication process is unlimited. FIG. 5 demonstrates a random distribution of security check performed by each module authentication process. Some modules are not authenticated at all, and some are checked more than once. The random choices for module authentication in FIG. 5 are intended to reflect the wide variety of possible module authentication sequences. Each of the security checks in FIG. 5 may be performed at any time with respect to the other security checks. Modules that are considered important may be authenticated more often, or some other method of determining which modules should be authenticated, and when those modules should be authenticated, may be employed. For example, a methodical check of one module after another, conducted every 30 seconds, based upon the location of a module in disk storage 180 may be employed. Such a methodical practice may not, however, be ideal for foiling would-be attackers. Instead, a more random approach which checks modules at unpredictable times, and in an unpredictable sequence, is considered a preferred embodiment of the present invention.

Figure 6:
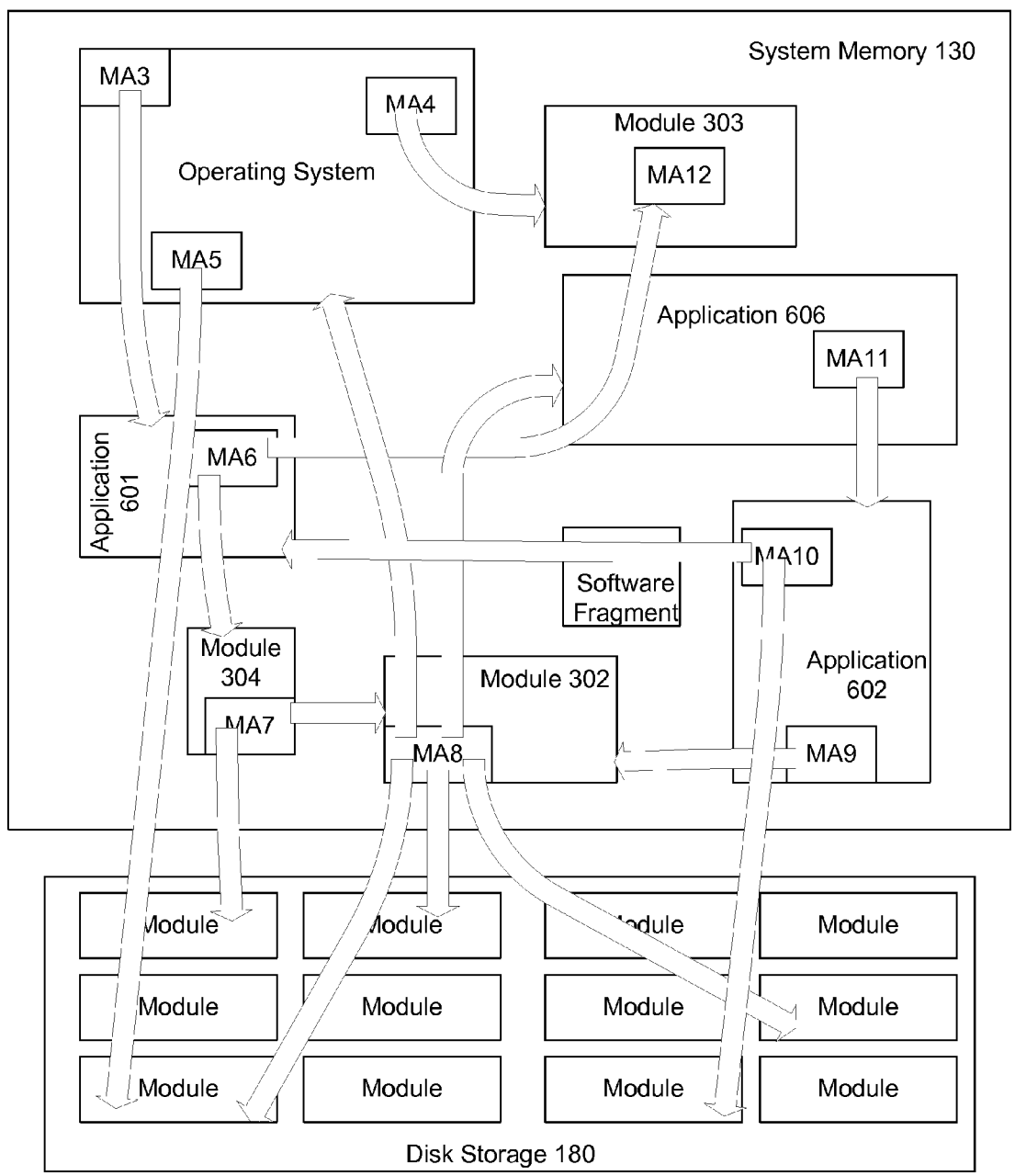
FIG. 6 illustrates multiple module authentication processes performing both static and dynamic module authentication.

Refer to FIG. 6, which extrapolates from FIG. 5 to another, somewhat more complicated view of embodiments of the invention. FIG. 6 demonstrates several possible aspects of the invention. First, it is intended to demonstrate that module authentication processes may perform security checks not only on modules in disk storage 180 as suggested by the arrows from module authentication processes in system memory down to modules in disk storage 180, but in system memory as well, as represented by the arrows from module authentication processes to other modules in system memory 130. For an explanation of performing security checks in system memory, refer to FIG. 4A, FIG. 4B, and FIG. 4C and accompanying text. For an explanation of on-disk or static module authentication, refer to FIG. 1A, FIG. 1B, FIG. 2 and accompanying text. Any other type of module authentication may also be performed in connection with embodiments of the invention.

FIG. 6 provides a system memory 130 that may be the same system memory 130 presented in earlier figures. Loaded into system memory 130 are an operating system, applications (which are a subset of modules), modules, and any other software fragments as explained above. Included within the various modules loaded into system memory 130 are module authentication processes, identified by boxes with "MA," for "Module Authenticator" followed by an identifying number. Just as the operating system of FIG. 5 contained multiple module authentication processes for performing security checks on modules in disk storage 180, the operating system in FIG. 6 contains multiple module authentication processes. This time, the various module authentication process of the operating system are depicted performing security checks on the various other modules loaded into system memory, as well as on the modules in disk storage 180. Moreover, FIG. 6 illustrates that the multiple module authentication processes taught by this invention need not be limited to the operating system. Instead, module authentication processes may be distributed throughout the other modules loaded in system memory 130. Module authentication processes may also be stored with modules that are not running in disk storage 180. Such modules are not depicted in FIG. 6, because modules generally must be loaded into system memory 130 in order to execute.

The distributed module authentication of FIG. 6 can be far more difficult to reverse engineer and disable than the prior art. Binaries that have been tampered may be the subject of a security check by any of the various module authentication processes at any time. In addition, as explained in connection with FIG. 5, the module authentication processes can perform security checks on other module authentication processes, or on the very module of which the module authentication process is a part. In FIG. 6, the arrow from MA6 to MA12 represents a security check by a first module authentication process on a second module authentication process. The scenario where a module authentication process performs a security check on the module of which it is a part is not illustrated, but one can easily imagine that a module authentication process such as MA12 could perform a security check on a module of which it is a part such as Module 303. Finally, the embodiments of the invention as depicted in FIG. 6 are not limited to a single computer. While FIG. 6 illustrates an undivided system memory and disk storage 180 suggestive of a single computer, the invention is not so limited and may be practiced in a distributed computing environment as explained in the general description of a suitable computing environment in the beginning of this document. Embodiments engaging in distributed module authentication across multiple computers will likely require some mechanism for coordinating security checks to ensure efficacy of the module authentication system.

Embodiments of the present invention also provide a method and system for coordinating the security checks performed by the various module authentication processes to ensure that module authentications are performed at an effective frequency based on the importance of performing a security check on a particular module. Without such coordination, it could be the case that despite the many module authentication processes in a system such as FIG. 6, certain modules, even important modules from the perspective of software security, may systematically go unauthenticated for a period of time that is considered unacceptable. While those of skill in the art will appreciate the many methods of coordinating the module authentication processes of FIG. 6 are suitable for use with the embodiments of the invention depicted therein, FIG. 7A and FIG. 7B are provided to suggest a preferred method for providing such coordination that integrates smoothly with the aspects of the invention heretofore described.

Figure 7A:
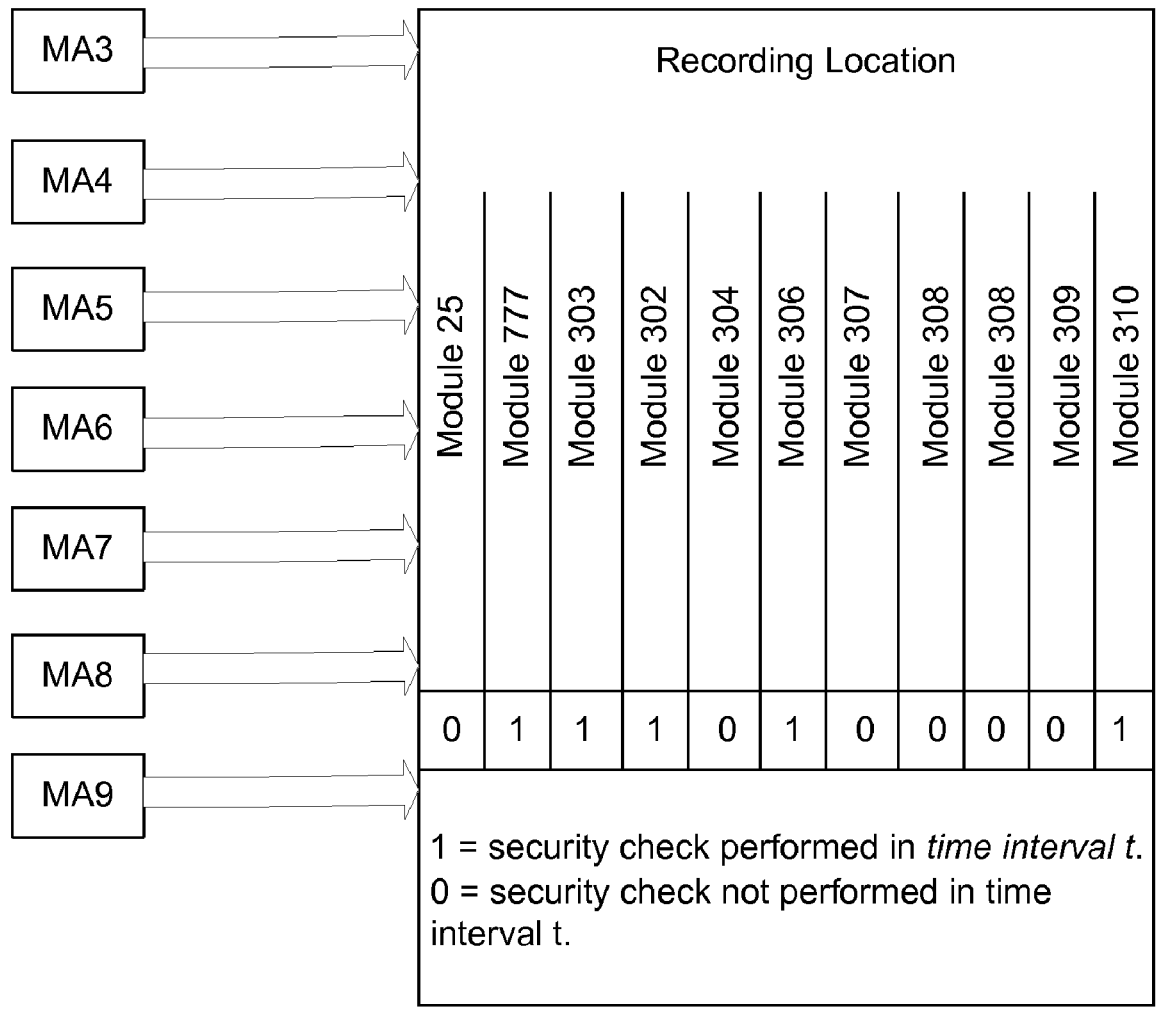
FIG. 7A illustrates a possible system for use in coordinating the module authentication processes, in which the processes record the performance of a module authentication in a recording location that is available to other module authentication processes.
Figure 7B:
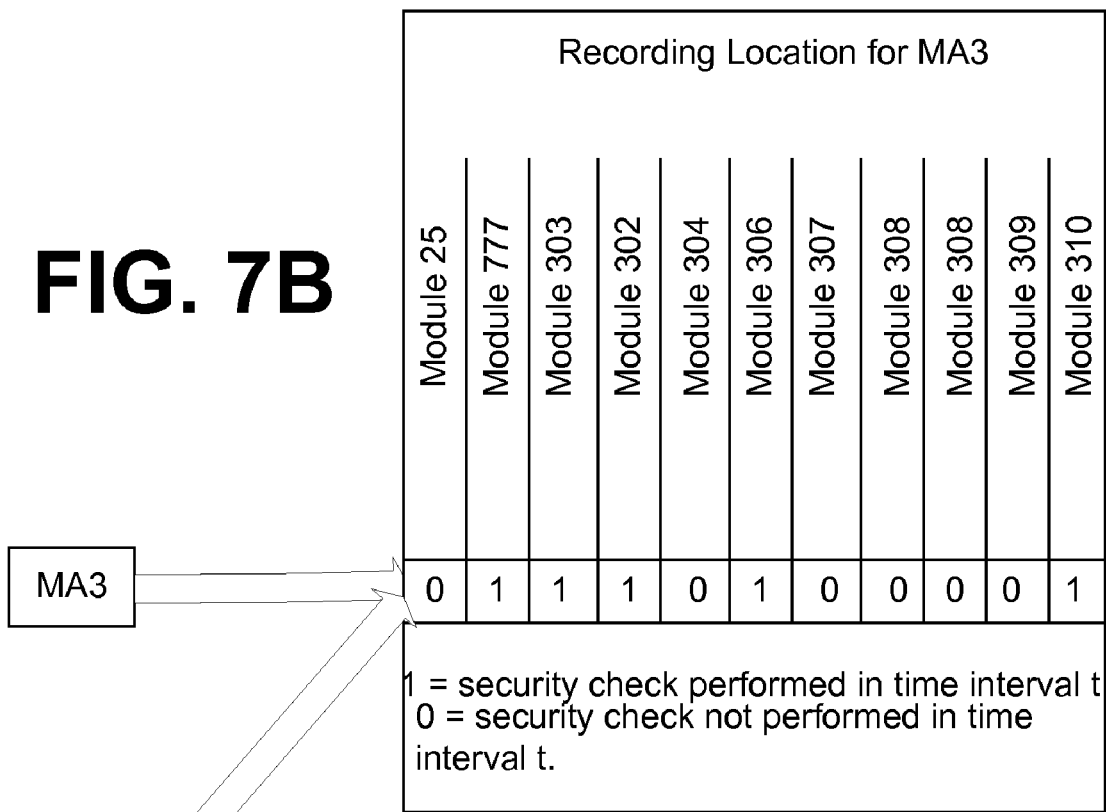
FIG. 7B illustrates another possible system for use in coordinating the module authentication processes, in which various processes are capable of recording the performance of an authentication in a private recording location visible to one or more other module authentication processes.
Figure 7B:
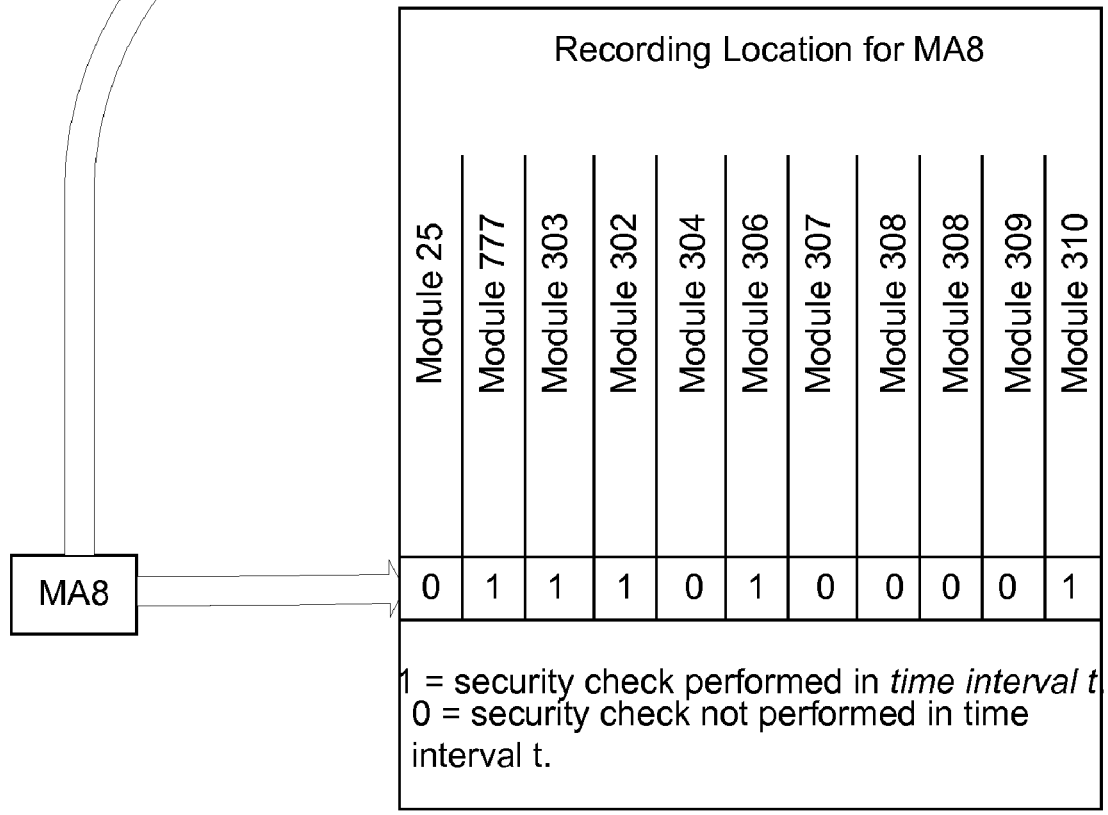

FIG. 7A represents various potential embodiments in which the various module authentication processes are coordinated through checking a recording location that tracks whether a security check has been performed in a recent time interval t for a particular module. Module authentication processes, such as those of FIG. 6, are in the column of boxes along the left hand side of the figure. Each module authentication process can be equipped with a randomly set timer, such that when the time on the timer has elapsed, the module authentication process will perform a module authentication and reset its timer. The interval for which timers may be set can be gauged such that a sufficient amount of security checks will be performed to ensure security of the modules running on a system, without requiring excessive processing that would otherwise interfere with the useful operation of the computer system.

When a module authentication process initiates a security check, it may first read from a recording location that indicates which modules have had a security check (presumably from some other module authentication process) in a particular time interval. The particular time interval for performance of a security check may be the same for all modules, or it may be different for modules depending for example on the priority of the module. The reading of the recording location by a module authentication process is indicated by the arrow from the module authentication process to the recording location.

The performance of a time interval within a time interval t may be recorded in any way. FIG. 7A depicts such recordation in the form of setting a bit associated with each module. In the illustrated embodiment, a one is interpreted as having performed a security check within time interval t, and a aero is interpreted as not having performed a security check within time interval t. This selection of the method of recordation is arbitrary, and it will be acknowledged that any other suitable method for recordation may be used in connection with the invention. In the illustrated embodiment, the bits that are set to one on completion of a security check are cleared (changed back to a zero) automatically after the time interval for that module lapses.

A module authentication process may then determine an appropriate module on which to perform a security check. This determination may be made simply by choosing any available module for which no security check was performed in the time interval t, or the determination may be based on some other criteria. In a preferred embodiment, the determination of an appropriate module is made in a manner that will eventually guarantee a large diversity of modules that are the subject of security checks, as well as greater redundancy in checking high priority modules. In various embodiments, each module authentication process may be equipped with a priority list of modules on which to perform security checks, and the priority list can be varied for different module authentication processes to ensure that a diverse selection of modules are authenticated. Upon determination of an appropriate module on which to perform a security check, the module authentication process conducts the security check, which involves module authentication in any of the techniques outlined above. Upon completion of the security check, the module authentication can record in the recording location that a security check was performed. For example, if Module Authentication Process 6 (MA6) determined to perform a security check on Module 307, it would change the bit associate with Module 307 from a zero to a one. This act, along with the initial reading of the recording location, is depicted by the arrow from the module authentication processes to the recording location.

The weakness of the implantation described in connection with FIG. 7A is that there is a centralized recording location. An attacker could hypothetically discover the recording location and change all the exemplary bits of FIG. 7A to a one, and thereby prevent security checks by the module authentication processes accessing that recording location. In the spirit of distributing security measures, FIG. 7B shows a more secure, if slightly more complicated implementation. Instead of maintaining a centralized recording location, multiple recording locations can be maintained. Recording locations may be maintained for each module authentication process, as depicted in FIG. 7B, or they may be maintained for groups of module authentication processes, or they may be maintained independently for each module that is to be authenticated. FIG. 7B illustrates the notion that multiple recording locations can be maintained in connection with embodiments of the invention.

In this regard, FIG. 7B illustrates a recording location for Module Authentication Process 3 (MA3) as well as for Module Authentication Process 8 (MA8). For simplicity of exposing the concepts of the invention, these recording locations are depicted similarly to the recording location of FIG. 7A and described in detail in connection therewith. In FIG. 7B, however, a module authentication process such as Module Authentication Process 8 (MA8) can read from both its own recording location, as well as the recording location for Module Authentication Process 3 (MA3). The determination of whether to perform a security check on a particular module can be based on information from either recording location or from both. For instance, a module authentication process could be configured to alternate which recording location it reads from, or to verify that the recording locations match, and if they do not match, to perform a security check on the module or modules for which there is inconsistent information. Once again, upon conducting a security check, the module authentication process can modify the recording location to indicate completion of a security check for the appropriate module.

Figure 8:
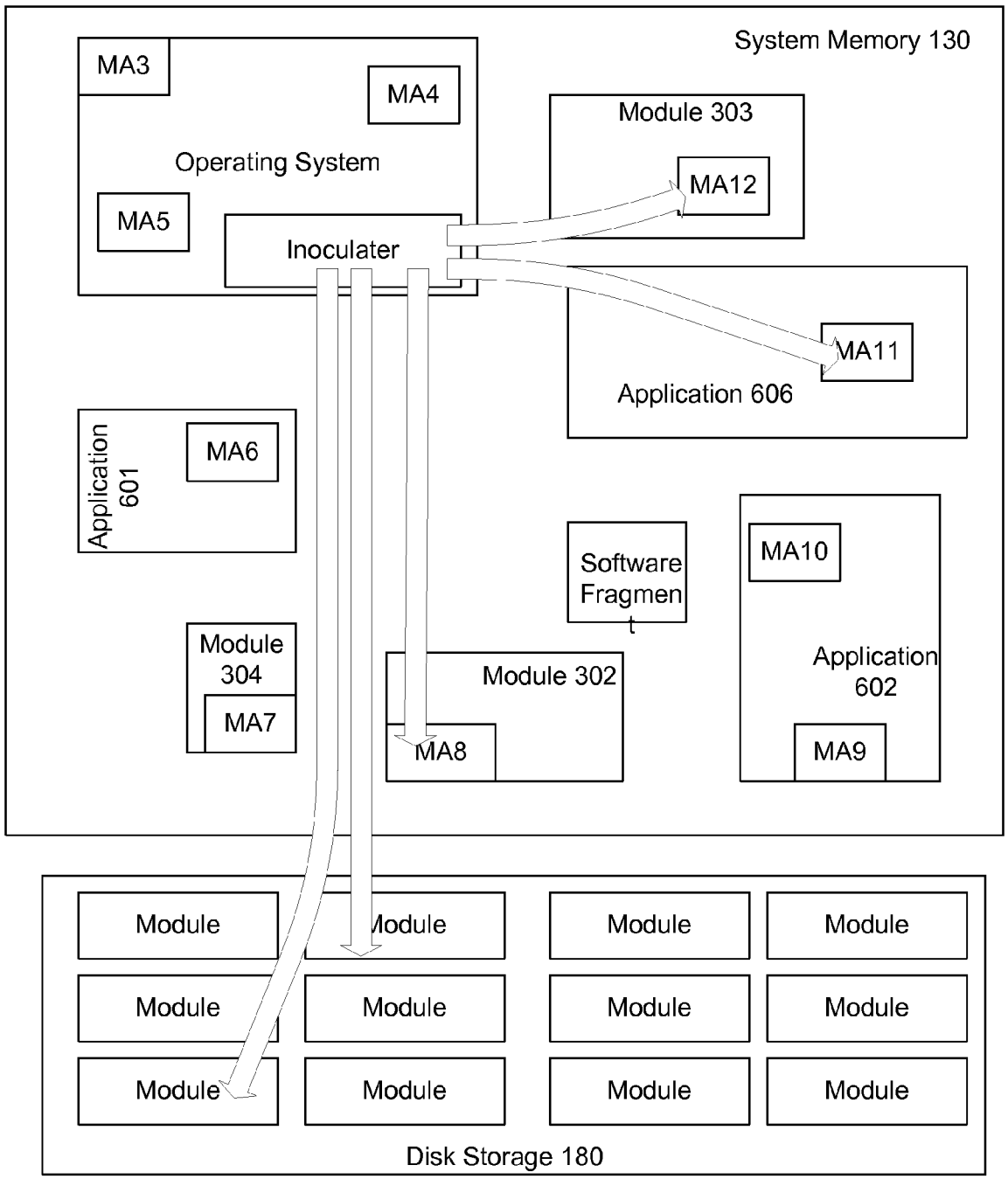
FIG. 8 illustrates inoculation of applications and other modules with module authentication processes by an inoculater process.

To assist in the implantation of distributed module authentication in accordance with the various embodiments described herein, an inoculater may be included with operating system or other software to inject the security features described herein into the various software modules loaded into system memory or stored in disk storage 180. In this regard, refer to FIG. 8. FIG. 8 provides a system much like that of FIG. 6, except that in FIG. 8 the operating system is equipped with an inoculater to assist with distributing the module authentication processes amongst the various modules. The arrows from the inoculater to the various modules in system memory represent an injection of a module authentication process into the binaries of the indicated module. For example, in FIG. 8 the inoculater has dynamically patched (this time legitimately and for the benefit, not the detriment of the software developer) application 606 with Module Authentication Process 11. The inoculater has also patched some of the modules recorded in disk storage 180, so that the next time these modules are loaded they will also load module authentication processes for use in conjunction with the techniques of this invention. An inoculater can be configured to add an remove module authentication processes so that security checks continue to originate from unpredictable locations.

The inoculater, as well as any original configuration mechanism for software implementing distributed authentication processes in accordance with the techniques disclosed herein, can be arranged to insert module authentication processes in such a way that they are very difficult to remove without damaging the useful function of a software module.

Standard commercial software protection technologies typically provide for wrapping application code with a security envelope that is independent of the application binaries. Such a security envelope can be very strong and may involve encryption. However, an application will eventually be decrypted and loaded into system memory in order to execute. Therefore, attackers can detect the decryption point of the protected software after which they either extract the decrypting key and remove the security envelope or place a breakpoint after the code has been decrypted and then save the unprotected code in a file. The binaries in such a saved file may represent the attacked application without the security envelope. In this scenario, security processor code is removed relatively easily without damaging an application itself.

Instead of permitting the above scenario, the inoculater, as well as any original configuration mechanism for software implementing distributed authentication processes in accordance with the techniques disclosed herein can achieve a distribution of the security processor code memory that is interleaved with module code in memory. This interleaving can be accomplished in various embodiments by automatically patching the binaries of random Import Address Table ("IAT") entries associated with a software module. Such IATs are of widespread use, and so using them to launch security processor code is both convenient and difficult to reverse engineer. For example, a typical application-sized module may have around 1000 IATs. The binary patch in an IAT can cause the IAT to undertake a module authentication process, as described above, prior to undertaking one or more of the non-security functions provided by the IAT. By including module authentication processes with IATs in this manner, discovery of the location of security processor code becomes very difficult because security checks can be executed from any random or apparently random location that makes a call to another module. The distribution of module authentication process throughout the various modules in computer memory can be based on an of a wide number of parameters with the intent of achieving a result in which the binaries representing security processor code may be interleaved with module binaries providing useful functionality.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A computer readable storage medium having computer executable instructions for verifying the integrity of software modules, said instructions comprising:

instructions corresponding to a plurality of software modules, wherein at least two of said software modules are configured to verify that no unauthorized changes have been made to at least one software module in said plurality of software modules; and instructions for recording a verification that no unauthorized changes have been made to said at least one software module in a recording location accessible by one or more of said two or more software modules, wherein said at least two of said software modules are further configured to check said recording location prior to subsequently verifying that no unauthorized changes have been made to said at least one software module.

2. The computer readable storage medium of claim 1, wherein one or more of said two or more software modules is configured to verify that no unauthorized changes have been made to a software module in system memory.

3. The computer readable storage medium of claim 1, wherein one or more of said two or more software modules is configured to verify that configured to verify that no unauthorized changes have been made to a software module in disk storage.

4. The computer readable storage medium of claim 1, further comprising instructions for checking said recording location prior to verifying that no unauthorized changes have been made to at least one software module.

5. The computer readable storage medium of claim 1, further comprising instructions for inoculating a software module with a module authentication process, such that the inoculated software module will verify that no unauthorized changes have been made to at least one software module in said plurality of software modules.

6. The computer readable storage medium of claim 5, wherein inoculating a software module comprises altering an Import Address Table ("IAT") used by the inoculated software module, such that that when the IAT is used by the inoculated software module, the IAT causes a process of verifying that no unauthorized changes have been made to at least one software module to occur.

7. The computer readable storage medium of claim 1, wherein one or more of said two or more software modules is included in an operating system.

8. The computer readable storage medium of claim 1, wherein the computer readable medium is included in a handheld device.

9. A computer readable storage medium having computer executable instructions for verifying the integrity of software modules, said instructions comprising:

instructions corresponding to a plurality of software modules, wherein at least one software module of said plurality of software modules is configured to verify that no unauthorized changes have been made to at least one other software module in said plurality of software modules, and is further configured to record in a recording location a verification that no unauthorized changes have been made to the least one other software module, and is further configured to check said recording location prior to subsequently verifying that no unauthorized changes have been made to said at least one software module.

10. The computer readable storage medium of claim 9, wherein said at least one software module is configured to verify that no unauthorized changes have been made to said least one other software module in system memory.

11. The computer readable storage medium of claim 9, wherein said at least one software module is configured to verify that no unauthorized changes have been made to said least one other software module in disk storage.

12. The computer readable storage medium of claim 9, further comprising instructions for checking said recording location prior to verifying that no unauthorized changes have been made to said at least one other software module.

13. The computer readable medium of claim 9, further comprising instructions for inoculating a software module with a module authentication process, such that the inoculated software module will verify that no unauthorized changes have been made to at least one software module in said plurality of software modules.

14. The computer readable storage medium of claim 13, wherein inoculating a software module comprises altering an Import Address Table ("IAT") used by the inoculated software module, such that that when the IAT is used by the inoculated software module, the IAT causes a process of verifying that no unauthorized changes have been made to at least one software module to occur.

15. The computer readable storage medium of claim 9, wherein said at least one software module is included in an operating system.

16. The computer readable storage medium of claim 9, wherein said computer readable medium is included in a handheld device.

17. A computer readable storage medium having computer executable instructions for verifying the integrity of software modules, comprising:
   instructions for placing a module authentication process in one or more IATs of one or more software modules that provide useful functions other than ensuring the security of software,
   wherein the module authentication process performs verifications that software modules have not been changed in an unauthorized way, records verifications that no unauthorized changes have been made to said software modules in a recording location, and check the recording location prior to subsequently verifying that no unauthorized changes have been made to said software modules, and
   wherein the one or more IATs initiate the module authentication process in addition to performing any original functions intended for the one or more IATs.

18. The computer readable storage medium of claim 17, wherein said module authentication process records the performance of verifications that software modules have not been changed in an unauthorized way.

19. The computer readable storage medium of claim 17, wherein one or more of said module authentication processes check a recording location prior to performing verifications that software modules have not been changed in an unauthorized way, and wherein said check is to determine an appropriate software module on which to perform a verification.

20. A method for verifying the integrity of software modules, comprising:
   inoculating a software module with a module authentication process;
   verifying by said software module that no unauthorized changes have been made to at least one other software module in a plurality of software modules;
   recording in a recording location by said software module a verification that no unauthorized changes have been made to said at least one other software module; and
   checking said recording location by said software module prior to subsequently verifying that no unauthorized changes have been made to said at least one other software module.

21. The method of claim 20, wherein inoculating said software module comprises altering an Import Address Table ("IAT") used by the software module, such that that when the IAT is used by the inoculated software module, the IAT causes said verifying.

22. A computer readable medium storage having computer executable instructions for verifying the integrity of software modules, comprising:
   instructions for inoculating a software module with a module authentication process;
   instructions for verifying by said software module that no unauthorized changes have been made to at least one other software module in a plurality of software modules;
   instructions for recording in a recording location by said software module a verification that no unauthorized changes have been made to said at least one other software module; and
   instructions for checking said recording location by said software module prior to subsequently verifying that no unauthorized changes have been made to said at least one other software module.

23. The computer readable storage medium of claim 22, wherein inoculating said software module comprises altering an Import Address Table ("IAT") used by the software module, such that that when the IAT is used by the inoculated software module, the IAT causes said verifying.

* * * * *